United States Patent Office 3,200,048
Patented Aug. 10, 1965

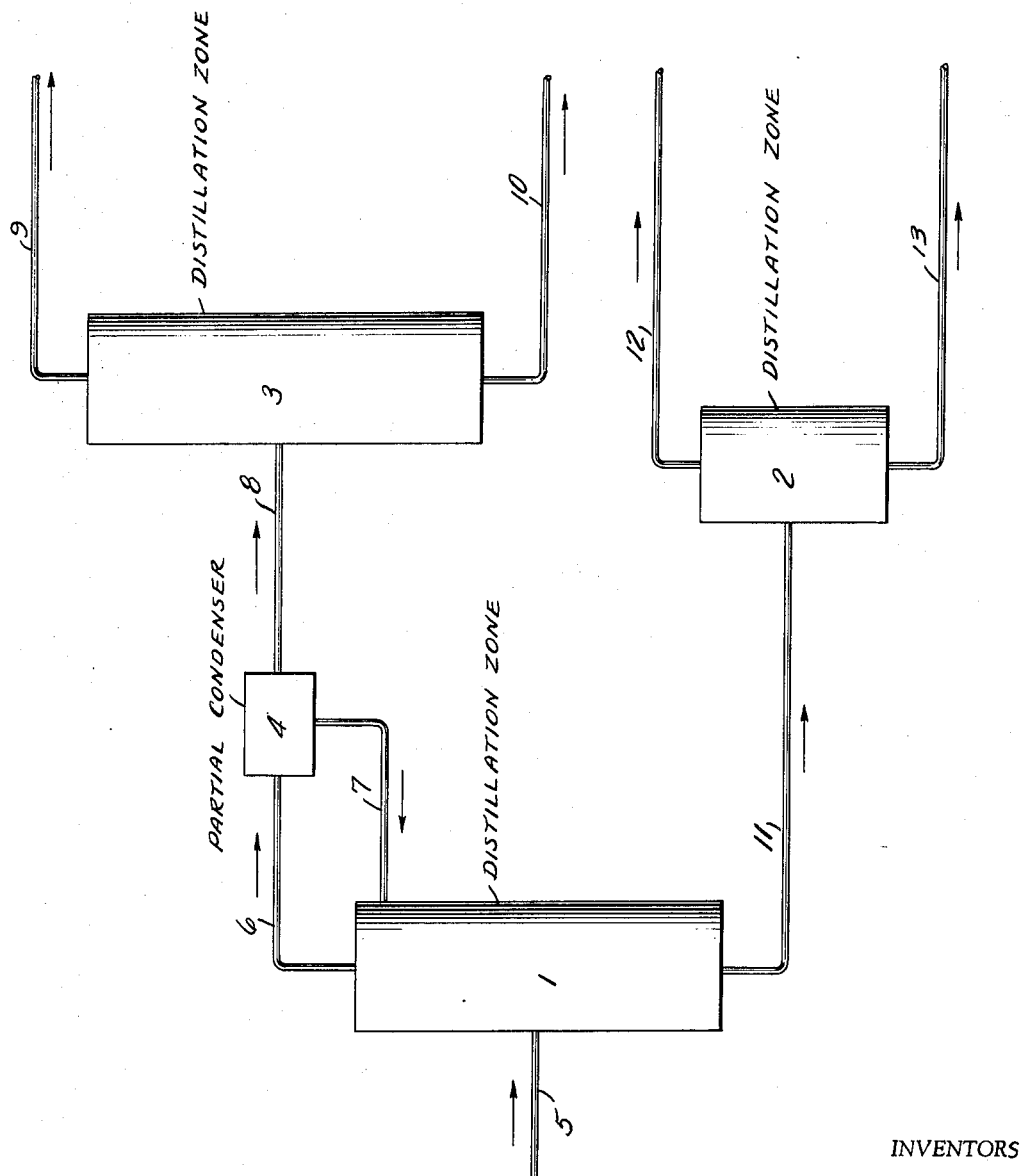

3,200,048
METHOD OF PURIFYING MONOCHLORO COMPOUNDS
Donald H. Briggeman, Niagara Falls, and Leland J. Lutz and Charles J. Smith, Jr., Grand Island, N.Y., assignors to Olin Mathieson Chemical Corporation, a corporation of Virginia
Filed May 18, 1954, Ser. No. 430,522
5 Claims. (Cl. 202—40)

Our invention relates to a method for the recovery of certain monochloro compounds which are prepared by a phosgenation reaction.

Brown, Lutz, Smith and Weilmuenster application, Serial No. 404,373, filed January 15, 1954, describes an improved method for carrying out the following reaction:

$$(RO)(R'O)P(O)(R'') + COCl_2 \rightarrow (Cl)(R'O)P(O)(R'') + RCl + CO_2$$

In the foregoing equation and in the remainder of this specification, R, R' and R'' represent alkyl radicals. The carrying out of this reaction results in the preparation of a complex reaction mixture which contains the compound (Cl)(R'O)P(O)(R''), carbon dioxide, phosgene and RCl.

The primary object of our present invention is to provide the art with an effective and economical method for the recovery of (Cl)(R'O)P(O)(R'') from this complex type of phosgenation reaction product. The solution to the problem of recovering the desired phosphorus compound from a reaction mixture of the type just indicated is not easily accomplished. In the first place, the reaction mixture is of a complex nature, containing as it does several ingredients. In addition, the phosgenation reaction mixture is an extremely corrosive one, so that from the standpoint of plant design it is highly desirable to be able to employ a process in which glass-lined, that is, low pressure equipment, can be utilized. Moreover, the temperature conditions involved in the recovery operation must be kept low in order to avoid decomposition of the phosphorus compound desired. Furthermore, it is advisable to provide means whereby phosgene can be recovered in order to make the process economical and at the same time avoid a disposal problem.

In accordance with our invention, we have been able to devise a process meeting the aforementioned requirements for the recovery of (Cl)(R'O)P(O)(R'') from a complex mixture which contains carbon dioxide, phosgene and RCl. The method which we have devised involves introducing the phosgenation mixture as feed into a first distillation zone which is operated at subatmospheric pressure. Carbon dioxide, phosgene and a minor proportion of RCl present in the feed are removed as overhead and RCl and (Cl)(R'O)P(O)(R'') are removed as bottoms from this first distillation zone. The overhead from the first distillation zone is introduced into a partial condenser and the liquid condensed in this condenser is returned to the first distillation zone as reflux. The bottoms from the first distillation zone are flashed in a second distillation zone operated at subatmospheric pressure. In this second distillation zone, RCl is removed as overhead and (Cl)(R'O)P(O)(R'') as bottoms.

The bottoms from the second distillation zone, consisting essentially of (Cl)(R'O)P(O)(R''), is a useful material as such, although the phosphorus compound present therein can, if desired, be further purified by distilling it overhead under a high vacuum. The vapors from the first distillation zone which are not condensed in the partial condenser consist essentially of carbon dioxide and phosgene, and those compounds, if desired, can be separated by fractional distillation in a third distillation zone operated at superatmospheric pressure in accordance with procedures which are well understood in the art.

When the phosgene is thus recovered it can be used again, for example, in the process of the aforementioned Brown, Lutz, Smith and Weilmuenster application, Serial No. 404,373.

For a more complete understanding of the method of our invention reference is made to the accompanying drawing which sets forth an arrangement of apparatus in which our invention can be carried out. In the drawing, the numerals 1, 2 and 3 designate, respectively, the first, second and third distilling zones, which are suitably distillation columns of conventional design. The numeral 4 represents the partial condenser. The complex phosgenation reaction mixture containing $$(Cl)(R'O)P(O)(R'')$$

carbon dioxide, phosgene and RCl is introduced into distillation column 1 through line 5. The overhead from column 1 containing carbon dioxide, phosgene and a minor proportion of RCl introduced through line 5 passes through line 6 into partial condenser 4. Liquid condensed in partial condenser 4 is returned through line 7 to column 1, whereas the vapors which pass through partial condenser 4 enter column 3 through line 8. Carbon dioxide is taken overhead through line 9 and phosgene is removed as bottoms through line 10 from distilling column 3. Line 11 serves to conduct the bottoms from column 1, containing (Cl)(R'O)P(O)(R'') and RCl, into column 2 in which the bottoms from column 1 are flashed.

As illustrating a specific operation falling within the scope of our invention, through line 5 there is introduced a mixture consisting essentially of carbon dioxide, phosgene, isopropyl chloride, (Cl)(i-PrO)P(O)CH₃ and residue in the following amounts in pounds per hour: 3.51, 1.58, 6.33, 12.50, and 4.06. This constitutes a typical reaction mixture prepared in accordance with the aforementioned Brown, Lutz, Smith and Weilmuenster application, Serial No. 404,373. Column 1 is operated at an absolute pressure of 200 mm. of mercury with a reboiler temperature of about 30° C. Carbon dioxide, phosgene and isopropyl chloride pass overhead from column 1 through line 6 in the following amounts in pounds per hour: 3.87, 9.20 and 1.31. Partial condenser 4 is operated at a temperature of −30° C., condensing carbon dioxide, phosgene and isoproyl chloride in the amounts of 0.36, 7.78 and 1.23 pounds per hour all of which pass through line 7 as reflux to column 1. Through line 8 there flows a vapor mixture composed of carbon dioxide, phosgene and isoproyl chloride in the following amounts in pounds per hour: 3.51, 1.42 and 0.08.

The bottoms leaving column 1 through line 11 is composed of carbon dioxide, isopropyl chloride, $$(Cl)(i-PrO)P(O)CH_3$$

and residue in the following amounts in pounds per hour: 0.16, 6.25, 12.50 and 4.06. These bottoms are flashed in column 2 at a temperature of 32° C. and 30 mm. of mercury pressure. Overhead passes through line 12 and is composed of phosgene, isopropyl chloride and (Cl)(i-PrO)P(O)CH₃ in the following amounts in pounds per hour: 0.16, 6.13 and 0.25. The bottoms passing through line 13 is composed of isopropyl chloride, (Cl)(i-PrO)P(O)CH₃ and residue in the following mounts in pounds per hour: 0.12, 12.25 and 4.06. Column 3 involves a conventional superatmospheric distillation operation to remove carbon dioxide overhead through line 9 and phosgene as bottoms through line 10.

Our process is generally useful in separating $$(Cl)(R'O)P(O)(R'')$$

from the reaction mixture which results when that compound is produced by reacting (RO)(R'O)P(O)(R'')

and phosgene in accordance with the equation given above. For example, it can be employed in separating $(Cl)(R'O)P(O)(R'')$ from the reaction mixture produced in accordance with the Brown, Lutz, Smith and Weilmuenster application, Serial No. 404,373, which describes the reaction of $(RO)(R'O)P(O)(R'')$ with from 1.0 to 1.3 molar equivalents of phosgene at a temperature within the range 55–85° C. and a pressure within the range 50–500 p.s.i.g. In accordance with the disclosure of Serial No. 404,373, R, R' and R'' are preferably alkyl radicals having not more than four carbon atoms. In general, the reaction mixture subjected to separation in accordance with our process will be composed of carbon dioxide, phosgene, RCl, $(Cl)(R'O)P(O)(R'')$ and residue in the following weight ranges, respectively, depending upon the particular method employed in carrying out the phosgenation reaction: 1:6, 0.5:5, 4:10, 8:20, and 2:6.

In the specific illustration, the first distillation zone (column 1 of the drawing) was operated at an absolute pressure of 200 mm. of mercury but this particular pressure is not critical and can be varied somewhat. The first distillation zone should, however, be operated under a vacuum in order to prevent undue decomposition, preferably at an absolute pressure of from 100 to 350 mm. of mercury. Nor is the 30 mm. of mercury absolute pressure at which the second distillation zone (column 2 of the drawing) is operated critical. Here again, the operation should be performed at subatmospheric pressure, generally within the range from 10 to 100 mm. of mercury. Further, although partial condenser 4 was operated at a temperature of −30° C. in the specific illustration, temperatures varying therefrom can also be used, the object being to operate the partial condenser at a low temperature such that only a minor proportion of RCl present in the feed passes through line 8 and reflux is provided to the first distillation zone.

We claim:
1. A method for the recovery of a compound of the formula $(Cl)(R'O)P(O)(R'')$ from a mixture which consists essentially of the aforementioned compound, carbon dioxide, phosgene and RCl which comprises introducing said mixture into a first distillation zone operated at subatmospheric pressure, removing carbon dioxide, phosgene and a minor proportion of the RCl present in the feed as overhead and removing RCl and $(Cl)(R'O)P(O)(R'')$ as bottoms; passing the overhead from the first distillation zone into a partial condenser and returning liquid condensed therein as reflux to the first distillation zone; and flashing the bottoms from the first distillation zone in a second distillation zone and removing RCl as overhead and $(Cl)(R'O)P(O)(R'')$ as bottoms; R, R' and R'' being alkyl radicals.

2. A method according to claim 1 in which the vapors passing through the partial condenser are introduced into a third distillation zone in which carbon dioxide is removed as overhead and phosgene as bottoms.

3. A method according to claim 1 in which R, R' and R'' are alkyl radicals having not more than 4 carbon atoms each.

4. A method according to claim 1 in which R and R' are isopropyl and in which R'' is methyl.

5. A method according to claim 1 in which the first distillation zone is operated at an absolute pressure of from 100 to 350 mm. of mercury and in which the second distillation zone is operated at an absolute pressure of from 10 to 100 mm. of mercury.

No references cited.

NORMAN YUDKOFF, *Primary Examiner.*

WILLIAM G. WILES, CARL D. QUARFORTH,
*Examiners.*